Jan. 25, 1966   J. L. PETERS   3,231,735
MASS SPECTROMETER LEAK DETECTOR WITH AN ACCELERATOR SECTION
BETWEEN PLURAL ANALYZERS AND THE METHOD FOR USING SAME
Filed June 11, 1959   3 Sheets-Sheet 3
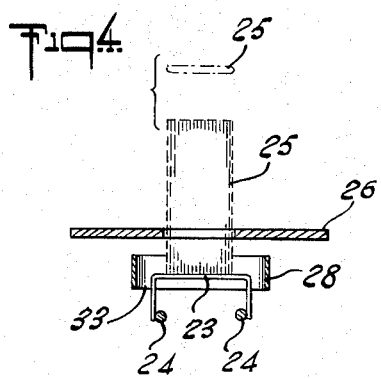
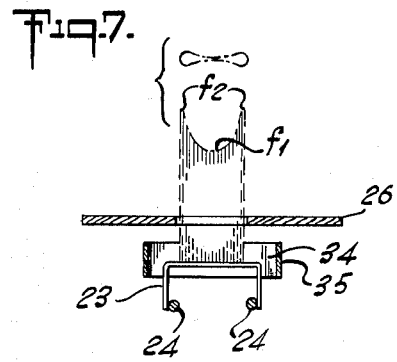
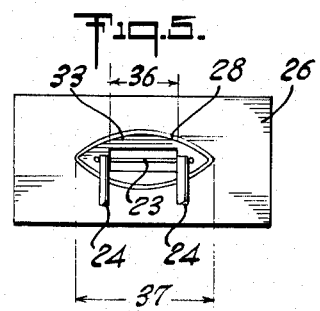
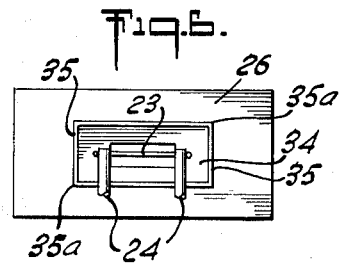
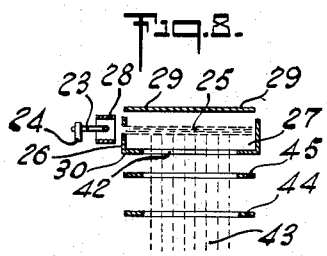
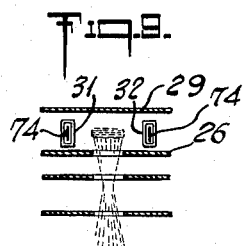
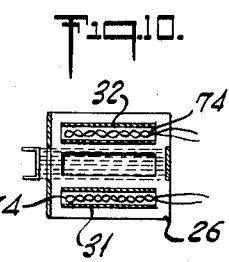
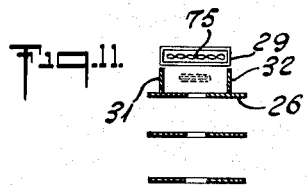
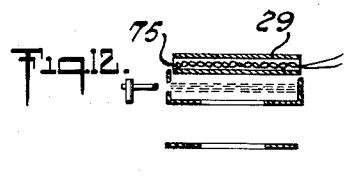
INVENTOR
JOHN L. PETERS
BY
ATTORNEY United States Patent Office 3,231,735
Patented Jan. 25, 1966

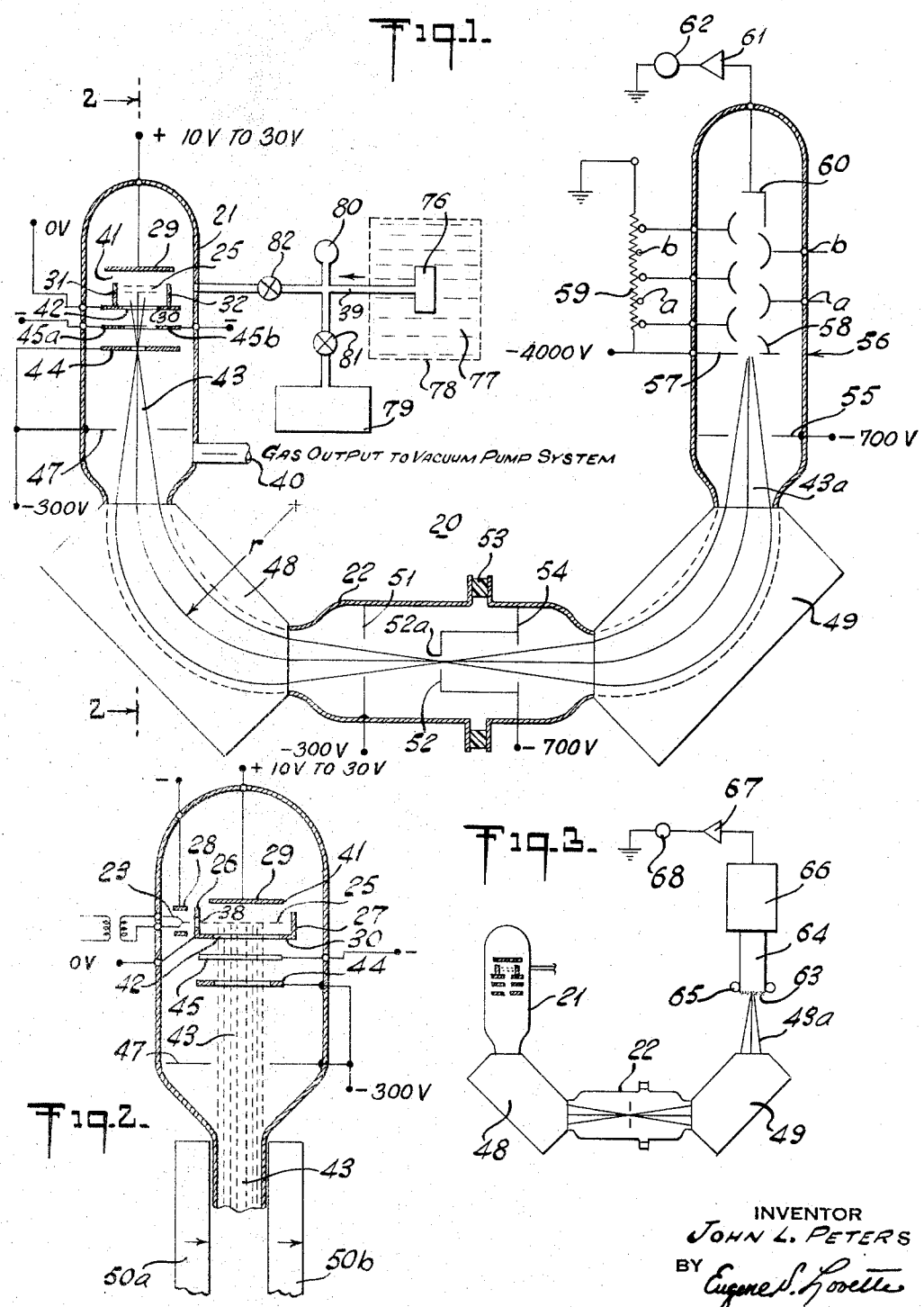

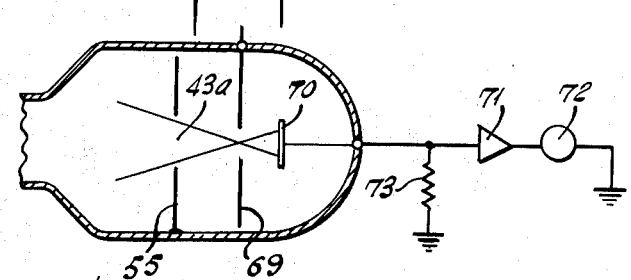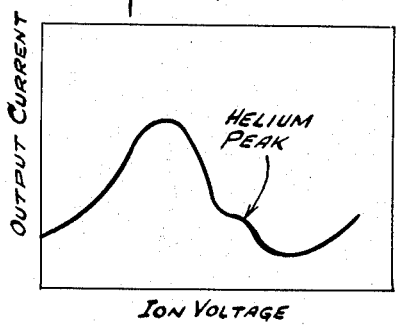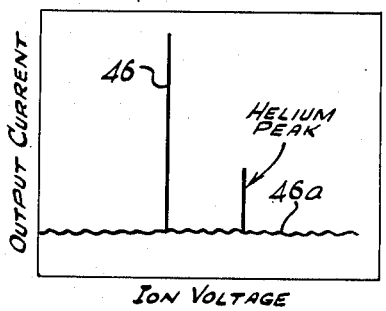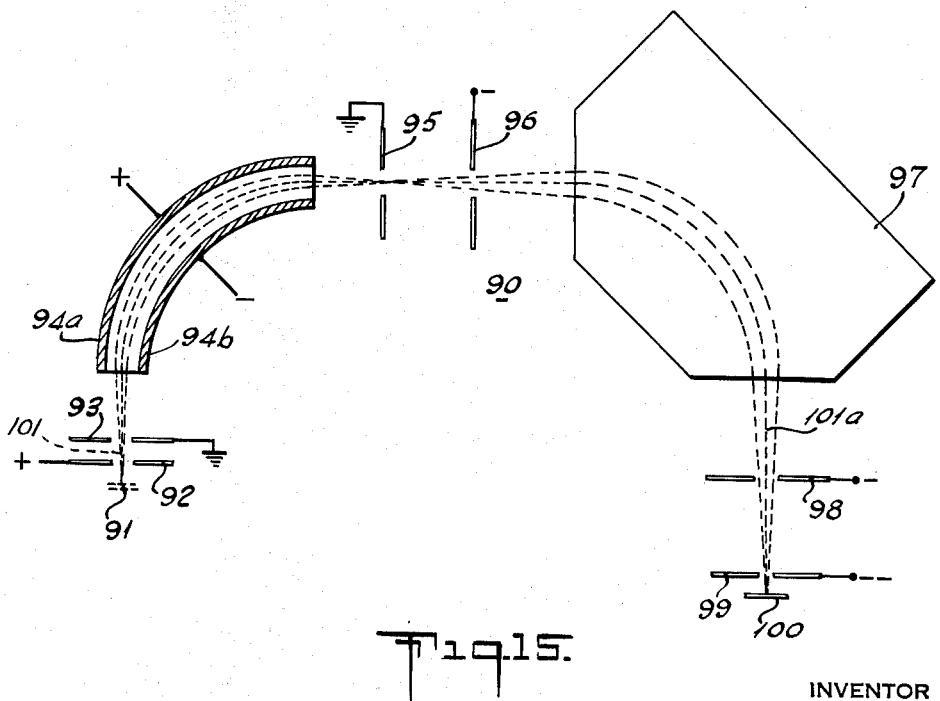

1

3,231,735
MASS SPECTROMETER LEAK DETECTOR WITH AN ACCELERATOR SECTION BETWEEN PLURAL ANALYZERS AND THE METHOD FOR USING SAME
John L. Peters, 114 Dikeman St., Hempstead, N.Y.
Filed June 11, 1959, Ser. No. 819,747
16 Claims. (Cl. 250—41.9)

The present invention relates to improved means and process for detecting and locating minute leaks in structure defining enclosed vacuum or pressure regions. In particular, the invention relates to mass spectrometer means employed as a leak detector for measuring and locating minute leaks in vacuum tubes and other like devices for the purpose of improving the shelf life and reliability of such tubes and devices.

The shelf life a vacuum tube can be assured with greater accuracy and reliability if the tube is tested during fabrication at the exhaust station just before seal-off. Normally, tubes are tested for tightness before exhaust. However, the high temperature baking and overload operation of exhaust processing often cause new leaks to develop. Consequently, tubes as noted before should be checked for leaks just before seal-off. This can be accomplished by connecting a leak detector to the fore line of the pumping station through a proper system of valves. The device under test is surrounded by a tracer gas, such as helium. Helium will penetrate even the smallest of leaks in the tube, if present, whereby helium gas with other foreign gases emitted by the tube components are drawn as a mixture into the leak detector for resolution and detection. Such a final check of the tube after exhaust processing, just prior to seal off from the pumping station, would contribute measurably to assuring reliability and long shelf life, provided an ultra-sensitive leak detector were available to make the test.

The most sensitive of the current commercial leak detectors are capable of detecting vacuum tube leaks of the order of $10^{-10}$ standard cubic centimeters per second. At this sensitivity such leak detectors will only assure that if a tube (of 100 cc. volume, for example) passes a test for tightness it will not leak to a pressure of $10^{-4}$ mm. Hg, where it is inoperative, until four days or more have elapsed. A leak detector with a 1000 times greater sensitivity, vis., $10^{-13}$ standard cubic centimeters per second, will be able to guarantee that similar vacuum tubes which pass a test for tightness on this more sensitive equipment will not leak to a pressure of $10^{-4}$ mm. Hg for 1000 times four days, or over 10 years. There will be an attendant proportional increase in operational reliability since the same very small and presently undetectable leaks which now make assured shelf life unattainable, also adversely affect vaccum tube operation causing operating tubes to fail at any time through accumulative air leakage.

It is, therefore, the principal object of the invention to provide means in the nature of a process and apparatus for detecting leaks with a sensitivity at least 1000 times or better than known leak detectors and capable of such leak detection sensitivity at operating pressures in the order of $10^{-5}$ to $10^{-6}$ mm. Hg. Improved ultra-sensitive leak detection in accordance with the practice of the present invention will promote tube reliability by locating accurately the point of leakage in the vacuum tube so that the reason for the leak can be understood to permit suitable processing to prevent failures of such type occurring again. Such ultra-sensitive operation also will lead to improvement of detection and rejection of defective materials, components and other sub-assemblies constituting the tubes.

2

Returned tubes now may be checked in accordance with the present improvements to determine accurately if any actual leaks have developed. For example, rough handling may be responsible for a newly developed leak and physical damage caused by such handling should coincide with the point of leakage. Finding the leak will pinpoint the difficulty which can be avoided in the future. Current leak detectors with a sensitivity of only $10^{-10}$ standard cc./sec. do not locate the small leaks in the majority of the returned tubes since this level of sensitivity is not adequate, whereby failure of vacuum tubes due to increased internal gas pressure is frequently blamed on outgassing. The definition of outgassing in the case of a finished vacuum tube is "a slow release of gas by the interior parts of the tube." This can be controlled by design, choice of materials and processing procedure once the manufactruer ascertains that outgassing and not minute leaks is responsible for the increase of internal pressure of the tube, because outgassing and small leaks both produce the same result, a slow increase in gas pressure inside the tube. Leak detection in accordance with the practice of the present invention will accurately and quickly determine whether a gassy tube, i.e. failure due to increased internal gas pressure, has deteriorated from a slow minute leak or whether the tube is tight and failure is a result of outgassing, whereby such results are not feasible with leak detectors constructed in accordance with the existing art.

Prior art leak detectors can be used at high sensitivity but only at a prohibitive cost in operating time and other limitations. The leak detector, with the sample to be tested hermetically sealed thereto, would have to withstand baking at 400° to 450° C. for one or two days while being continuously pumped, or until a pressure of $10^{-9}$ to $10^{-10}$ mm. Hg was reached. This low pressure is necessary with prior art leak detectors in order to reduce the background sufficiently so that sensitivity can be significantly increased.

Accordingly, it is a further object and advantage of the present invention to provide mass spectrometer means capable of ultra-sensitive leak detection capable of operating at pressures of the order of $10^{-5}$ mm. Hg and furnishing a response speed within a few seconds; which improved leak detection means is capable of sensing a leak rate of $10^{-13}$ standard cc./sec. which will produce a deflection of at least 10% on the output meter with a signal to noise ratio of one or better.

Such objects and advantages in accordance with the present invention are achieved by mass spectrometer means sensitive to a gas, such as helium as a tracer, which gas is ionized and subject to first order directional focusing by a plurality of analyzers, as for example two sector magnetic analyzers as illustrated herein, and preferably accelerating the ionized beam emerging from the first analyzer through an interstage slit between the two analyzers and then accelerating the beam emerging from the second analyzer and impinging the incident beam upon detector means characterized by a secondary-emission ratio increasing in proportion to the voltage potential applied by the accelerating means to the incident beam.

It is the current practice in the art to employ source magnets at the ionization chamber of the mass spectrometer for focusing the electron beam. The use of such magnets is not entirely satisfactory since their positioning for optimum operation is critical. If they are external they are easily thrown out of adjustment and if they are internal the adjustment cannot be made in operation and is, therefore, guesswork. Accordingly, it is a further object and advantage of the improvements herein to focus the electrons in the ionization chamber by electrostatic means of such design to produce an electron beam of uniform focal length and thus substantially rectilinear in cross-section for collision with the gas mixture to be ionized.

It is also the current practice of the art to disassemble and clean the ionization chamber once a day or every few days to remove contaminating films formed on electrodes defining the chamber; the films are caused by ion and election bombardment of the electrodes. It is a further object and advantage of the improvements herein to introduce unipotential heated surfaces in the ion source whose function is to add thermal energy to the ionization chamber in order to increase the efficiency of positive ion formation and to suppress electrode contamination.

Further objects and advantages will become apparent from the following description of the invention taken in conjunction with the figures, in which:

FIG. 1 is a cross-sectional view of a mass spectrometer leak detector in accordance with the practice of the improvements herein;

FIG. 2 is a fragmentary sectional view of the apparatus of FIG. 1 taken along line 2—2;

FIG. 3 depicts schematically a leak detector system employing a photomultiplier as its ion detector component;

FIG. 3a is a fragmentary sectional view which illustrates secondary emission means of simpler construction employed as the ion detector component;

FIG. 4 is a sectional view of a preferred embodiment for the electron beam forcusing means;

FIG. 5 is an end view of the structure of FIG. 4;

FIG. 6 is a sectional view of a rectangular focusing electrode for the electron beam;

FIG. 7 is an end view of the structure of FIG. 6 and the beam generated thereby;

FIG. 8 is a sectional view depicting schematically the components constituting the ionization chamber with certain parts removed to provide a better view of the illustrated details;

FIG. 9 is a sectional schematic view of the ionization chamber illustrating one embodiment of the heater means;

FIG. 10 is a sectional view of the structure of FIG. 9 showing a side elevation of the heater means;

FIG. 11 is a sectional view illustrating another embodiment for heater means in the ionization chamber;

FIG. 12 is a sectional view of the structure of FIG. 11 showing a side elevation of the heater means;

FIGS. 13 and 14 are curves of mass spectrometer current output plotted against ion beam acceleration voltage, which curves are used in the description of the invention; and FIG. 15 illustrates schematically another embodiment of a mass spectrometer leak detector in accordance with the practice of the invention.

Reference is now made to the figures, and in particular, FIGS. 1 and 2 for a leak detector 20 in accordance with the practice of the improvements claimed herein. Detector 20 involves a tube 21 made of non-magnetic electrically conductive material, such as copper or stainless steel. At the top left side, tube 21 encloses the ionization chamber. The ionization chamber includes a filament element 23 carried by support means 24 (FIGS. 4–8). Filament 23 is adapted to provide a beam of electron flow 25 across the chamber, which electrons are accelerated by an electrode 26 and are collected on a trap 27. The electrons are accurately focused and aligned by a focus electrode 28, electrode 26, and spaced electrodes 29, 30 on opposite sides of and co-extending the length of electron beam 25 to form a beam uniformly rectilinear in cross-section. The boundaries of the ionization chamber are completed by a pair of parallel spaced walls 31, 32 extending from electrode 30 and towards electrode 29 for confining the spread of electron beam 25.

Focus electrode 28 is supported and shaped to provide an aperture 33 whose cross-section is shaped like a section of a symmetrical double convex lens taken through the optical axis of the lens, as shown in FIG. 5. The electron beam 25 flows from filament 23 through focus electrode 28 to the collector 27, see FIGS. 4, 5 and 8. Focus electrode 28 is biased by a suitable negative potential with respect to filament element 23 to provide efficient focusing for generating a beam of uniform focal length to effect optimum spectrometer operation. For example, if the focus electrode were shaped to define a rectangular tubular aperture 34, as depicted in FIGS. 6 and 7, the focal length of the electron beam will be greater at its end portions, depicted as $f_2$, in comparison to the focal length at the center part of the beam, depicted as $f_1$ because the end plates 35 and corners 35a of the rectangular aperture 34 decrease the electrostatic field penetration into aperture 34. The cross-sectional shape of the electron current beam generated by aperture 34 is depicted in FIG. 7. To avoid this type of beam, the aperture 33 is shaped as shown in FIG. 5 because it produces an electron beam of uniform focal length and thus, uniformly rectangular in cross-section as depicted in FIG. 4. In one working embodiment, the desired electron beam was derived with aperture 33 for a beam width 36 (the width of the rectilinear slit in electrode 26) of 60% to 75% of aperture dimension 37. The foregoing arrangement offers the additional advantage in that the exact shape of aperture 33 is not critical for a rectangular electron beam of uniform focal length at least for low current densities employed in leak detection. Electrode 26 has a rectangular slit conforming to the desired shape of the electron beam 25 passing therethrough, and is operated at a positive potential with respect to filament 23 or generally about 150 to 180 volts above focus electrode 28. Electrode 26 also intercepts straying electrons and shields the chamber against secondary emission. As depicted throughout the spectrometer tube, a plurality of conducting leads are employed to connect the individual electrodes inside the spectrometer tube with suitable external voltage sources not shown.

The foregoing arrangement for focusing and aligning the electron beam by electrostatic means is adaptable for use with the sector types of spectrometer analyzers illustrated herein, and provides an improved ion source in comparison with known prior art structure. It is the practice in the current state of the art to employ small magnetic elements for focusing and aligning the electron beam, which magnets are mounted in the region of the ionization chamber. The use of such magnets in the ion source are not entirely satisfactory because of any one of a number of reasons. For example, the magnets require periodic alignment adjustments, and in addition, add to the bulk and complexity of the spectrometer which is detrimental to the tube structure. In some applications, the use of focusing magnets in the ion source introduces undesired mass discrimination. The use of electrostatic focusing furnished by the foregoing described ionization chamber is not discriminatory as to ion mass and overcomes the stated disadvantages of focusing magnets in the ionization chamber.

Referring again to FIGS. 1 and 2, the gas to be analyzed is fed into the mass spectrometer instrument through a gas inlet 39. The gas is drawn through the ionization chamber and out of the spectrometer instrument through a gas outlet 40 by pump means not shown in the figures. The pressure differential established by the foregoing arrangement causes the gas to drift into the ionization chamber via the space 41 between electrode 29 and walls 31, 32. Positive charged ionized gas particles are formed as the gas molecules collide with electrons of beam 25. Repeller electrode 29 is operated at a potential slightly positive with respect to the adjacent electrodes defining the ionization chamber and this starts the ionized gas particles to accelerate for flow in a direction making an angle with, and in the illustrated example, substantially orthogonal to the electron beam current and through a rectilinear slit 42 in electrode 30 on the other side of the electron beam. For the purpose of leak detector operation, trap 27 and electrodes 26 and 30 including walls 31, 32 may be an integral structure and operated at a zero voltage potential with repeller electrode 29 biased at approximately plus 10 to 30 volts with respect to electrode 30. The ionized gas particles passing electrode 30 are focused to form an ion beam 43 and are accelerated towards analyzer 48 by an electrostatic field supported between electrode 30 and an accelerator electrode 44 spaced from and following electrode 30. For example, a potential of minus 300 volts may be applied to electrode 44 with respect to electrode 30. A trimmer electrode may be included between electrodes 30, 44. As contemplated herein, the trimmer electrode is made up of a split pair of spaced elements 45a, b, between which ion beam 43 flows. Each element 45a, b may be operated at a slightly different voltage potential with respect to the other element of the pair in order to provide compensating deflections to optimize the focus of ion beam through a rectilinear slit in electrode 44. The means potential of the pair of elements 45a, 45b may be approximately the potential applied to electrode 30. For example, the mean potential applied to split electrodes 45a, b in one working embodiment of the invention is minus 30 volts with respect to electrode 30. A baffle electrode 47 at the same potential as electrode 44 is spaced from and following electrode 44 and is provided with a rectangular opening for passing ion beam 43 therethrough. As will be noted from FIGS. 1 and 2, ion beam 43 is substantially rectilinear in cross-section. The baffle electrodes illustrated herein serve to intercept ions straying from the geometrical beam to minimize secondary electrons.

The analyzer tube portion of spectrometer 20 includes a pair of magnetic analyzers 48, 49 separated by an intermediate portion 22 containing ion beam accelerating means. Analyzer tube portion 22 narrows into a constricted segment extending through the opposed pole pieces 50a, b of each magnetic analyzer 48, 49. Analyzers 48, 49 have spaced pole pieces 50a, b between which ion beam 43 passes. The magnetic field extends orthogonal to the ion beam (note arrows in FIG. 2) and causes beam 43 to bend along a curve of radius r in accordance with the following expression:

$$\frac{m}{e} = \frac{Kr^2H^2}{V} \quad (1)$$

wherein r represents the mean radius of the curved ion beam path within the magnetic field, H is the strength of the magnetic field in gauss, V is the ion accelerating potential in volts, K is a constant, and the ratio $m/e$ represents the relation of mass to charge ratio for the ions subject to such direction focusing. From the foregoing relationship, if the variables H and V are maintained at selected values, then ions having a homogeneous mass to charge ratio will bend along a path of travel as defined by radius r, whereas heavier and lighter ions will bend less than and greater than the aforesaid curve and will collect on the analyzer tube, baffles and wall.

The illustrated apparatus relies upon first order direction focusing and fundamentally is a momentum sensitive device, and requires a monoenergetic source of ions in order to become mass sensitive. First order focusing action occurs in the homogeneous magnetic field provided by the analyzers. In leak detector operation, the gaseous mixture fed into the ionization chamber is generally constituted by a plurality of two or more gases of different mass including a tracer gas, such as helium. The ionized particles of the gaseous mixture are accelerated by the electrostatic means preceding analyzer 48 to form a beam of ions of heterogeneous mass to charge ratio. This heterogeneous beam is separated or resolved upon projection through analyzer 48 into a plurality of beams, each of which is formed of ions of the same mass to charge ratio provided that analyzer 48 is operating at an extremely low pressure. The resolved beams are homogeneous with respect to mass to charge ratio, but the several beams are separated in accordance to mass to charge ratio. Upon a predetermined selection of accelerating potential V and the strength of the magnetic field H, a desired homogeneous beam of predetermined mass to charge ratio, such as the tracer gas, will bend along radius r. The ions of the other gases will deflect either more or less than the curved path of radius r depending upon their mass to charge ratio, and accordingly will be collected by tube 22, whereby only the tracer gas ions will continue to travel through analyzer tube portion 22 for detection. A substantially ideal response is depicted in FIG. 13, which is a plot of leak detector output vs. ion acceleration voltage V. The helium tracer, He, is selectively separated and distinguishable for sensitive detection from an ion gas beam of adjacent mass 46 and where 46a depicts the level of background noise.

The foregoing described phenomenon, i.e., the resolution of a heterogeneous gaseous mixture into a direction focused homogeneous beam of desired mass to charge ratio, is achieved when a spectrometer analyzer is operated at very low operating pressures, i.e., $10^{-9}$ or $10^{-10}$ mm. Hg. Such low pressures are available by making the spectrometer of glass in order to bake same during exhaust at very high temperatures for one or two days for testing samples. However, glass fragility, the necessity of making a glass seal to the samples to be tested and a baking time of one or two days, prohibits such low pressure operation for commercial leak detection. On the other hand, at the higher pressures in the order of $10^{-5}$, $10^{-6}$ mm. Hg, as is common in commercial leak detectors, gas scattering occurs in the resolved ion beam which causes excessive broadening of the signal peaks as illustrated in FIG. 14 and spurious signal peaks. Gas scattering is caused by the loss of energy by the heavier ions at the pressures of $10^{-5}$ and $10^{-6}$ mm. Hg, whereby ions of different mass appear to respond to the same voltage V. FIG. 14 depicts resolution of such an ion beam in comparison to the desired response depicted in FIG. 13. In FIG. 14, the tracer is all but masked out by the ionized gas particles of adjacent mass and, in addition, is almost indistinguishable from background noise.

Gas scattering prevents reliable detection or measurement of the desired signal, and in particular, prevents detection of a small signal peak which is partially or substantially masked by an adjacent broad signal peak. The deleterious effect of gas scattering is cumulative, for example gas scattering in the ion beam results in energy non-homogeneity of the ions which results in additional broadening of the peaks and spurious signals. Moreover, for large intensity ion beams involving high currents, i.e., large amplitude peaks, space charge defocusing becomes an important consideration because it results in additional broadening of the large amplitude peaks. The improved spectrometer illustrated herein overcomes the foregoing problems to permit more sensitive mass spectrometer use within the practical operating pressures employed in commercial leak detection. The improvement involves refocusing and accelerating ionized beam 43 through an interstage slit following analyzer 48 and then analyzing the accelerated beam through a second magnetic analyzer 49. Ions which were gas scattered in the first analyzer 48, thus broadening peaks, are resolved into separate peaks by the second analyzer 49. Acceleration between analyzers 48, 49 will add different amounts of momentum to the grouped ions of different mass in the beam emerging from analyzer 48. The ions which formed spurious signal peaks are selectively resolved into distinct beams by second analyzer 49. By means of the foregoing arrangements, false signals are refocused to be collected by analyzer tube 22, as the desired signal of homogeneous mass to charge ratio is passed by analyzer 49 for detection.

The accelerating means following analyzer 48 includes a baffle electrode 51 provided with a rectangular opening for passing beam 43 toward a rectangular interstage slit 52a of electrode 52. Interstage electrode 52 is supported at the region of refocus of beam 43, and baffle 51 intercepts ions and electrons outside of the beam proper to minimize secondary emission. Baffle 51 and electrode 52 provide a potential drop through which ions of beam 43 fall. In the illustrated embodiment, baffle 51 is operated at a minus 300 volts with respect to electrode 30 and is thus at the same potential as the accelerating means preceding analyzer 48. Electrode 52 is operated at a potential of minus 700 volts. Hence the latter portion of intermediate tube structure 22 is electrically isolated from the forward portion of tube structure 22 by means of insulating means 53. A baffle electrode 54 is spaced from and follows electrode 52. Baffle electrode 54 has a larger rectilinear opening than 52a allowing the divergence of the accelerated beam in the direction of travel. Baffle 54 is also operated at a minus 700 volts. As an alternative arrangement, acceleration may be provided between electrode 52 and baffle 54 in which case electrode 52 would be operated at minus 300 volts and isolated from baffle 54 which would be at the minus 700 volts.

The accelerated ionized beam enters the homogeneous magnetic field of analyzer 49 for resolution wherein the directionally focused tracer ions leave same for passage through a rectilinear opening in a baffle 55 spaced from and following analyzer 49. The ionized beam 43a emerging from analyzer 49 is characterized substantially as shown in FIG. 13, and this signal is substantially homogeneous mass to charge ratio beam. In the illustrated embodiment, analyzer 48 was adapted to provide a field of about 1000 gauss whereas analyzer 49 was adapted to provide a field of about 1500 gauss.

The ionized beam signal 43a emerging from analyzer 49 is characterized by a very high and favorable signal to noise ratio because of the very large reduction in background and noise effected by the described apparatus. This allows the use of secondary-emission amplifying means for ion detection, such as an electron multiplier, operating in a pressure of $10^{-5}$ or $10^{-6}$ mm. Hg. Amplification provided by the electron multiplier can be used in the same proportion as background noise is reduced. On the other hand, if an electron multiplier were used as the detector in known standard leak detectors of current practice, no improvement in signal sensitivity would be feasible because background and cross-talk between signals representing unresolved components of proximate mass numbers are already limiting the signal to noise ratio of the resolved output signal and, therefore, no further amplification can be used.

Further gain in signal sensitivity is possible when leak detection is practiced in accordance with the instant invention by accelerating the incident beam fed to the secondary-emission means, because secondary-emission ratio increases with beam potential. Accordingly, greater gain from the multiplier can be used without causing the signal to noise ratio to fall below an acceptable value. Acceleration of the incident beam to the multiplier increases its input and thus its signal to noise ratio. The foregoing described advantages of instant invention are cumulative, whereby signal sensitivity may be increased to 1000 times better than the response of prior art lead detectors while maintaining a favorable signal to noise at the output.

The foregoing advantages are achieved by accelerating the beam 43a emerging from analyzer 49 and detecting same by an electron multiplier 56. Multiplier 56 may be an integral part of tube structure 20. Beam 43a is accelerated by passing same through a potential drop between baffle electrode 55 and an electrode 57 spaced from and following baffle 55. In the illustrated embodiment, baffle 55 is operated at minus 700 volts and electrode 57 is coupled to the first multiplier dynode 58 and operated at minus 4000 volts. Successive dynodes of multiplier 56 are operated at higher potentials supplied from a source potentiometer 59, and the opposite potential end of potentiometer 59 is grounded at plus 4000 volts. The high energy incident beam 43a is caused to strike multiplier dynode 58 and by multiplier-secondary emission operation, a relatively large amplified signal is realized at the tube output 60 which is further amplified by means 61 and detected by meter 62.

FIG. 3 illustrates an alternative embodiment whereby the ions of incident beam 43a are accelerated to a very high potential. In this figure, the incident beam 43a impinges against a fluorescent screen 63 supported on the front end of a clear quartz rod 64 or other light conduit. A ring electrode 65 is supported around screen 63 and is operated at a potential of about minus 10 kilovolts to about minus 20 kilovolts. Electrode 65 is also a return for beam 43a. Since each high energy ion striking screen 63 produces a great many photons, the arrangement produces a gain in signal to noise ratio. The light is conducted by rod 64 to a photomultiplier tube 66 which is activated by the light to produce a large output signal further amplified by means 67 and detected by a meter 68.

In lieu of the electron multiplier of FIG. 1 or the photomultiplier of FIG. 3, ion detection means as depicted in FIG. 3a may be employed and contemplates an electrode 69 having a rectilinear slit following baffle electrode 55. Slit electrode 69 may be operated at some suitable positive potential with respect to baffle electrode 55 to oppose passage of ions having a velocity of lower potential energy than the desired ions, i.e. the slower moving ions of mass heavier than the helium ions. Electrode 69 is followed by a collector 70, which collector is made of silver-magnesium or other material having a secondary-emission ratio greater than one. The incident beam 43a upon passing through the slit in electrode 69 is caused to impinge upon collector 70, whereby the increased signal is further amplified by means 71 and detected by meter 72. Collector 70 is connected to ground through a high resistance return 73. As an alternative version, slit electrode 69 may be operated at some suitable negative potential to support an accelerating electrostatic field between electrode 69 and baffle 55 through which beam 43a falls. By this arrangement, the secondary-emission ratio of collector 70 is further increased by the applied voltage added by the potential drop between baffle 55 and electrode 69 to produce gain in signal to noise ratio.

As known in the art, after operating a leak detector for one or two days, the ion source becomes contaminated which seriously affects the sensitivity of the apparatus. This phenomenon is attributed to the bombardment of electrodes 26, 29, 30 of the ion source by electrons and ions in vacuo which causes contaminating films to form on these electrodes. It is the current practice in the art to disassemble the ion source and clean the ion chamber once a day or every few days in order to correct the problem. The instant invention contemplates overcoming the loss of time and inconvenience of disassmbly by heating the susceptible electrodes and maintaining these electrodes at temperatures of about 500° C. to about 1000° C. during warm-up, stand-by and operation of the apparatus. A working temperature of 800° C. has been used wherein it was found that the apparatus remains relatively constant in sensitivity for intervals of time as much as a month or more. In accordance with the foregoing purposes, heater means are incorporated in the ionization chamber. FIGS. 9 and 10 show one embodiment wherein heater elements 74 are individually contained within operating electrode walls 31, 32 so that the working area of the electrode in the ion chamber is unipotential. This arrangement also adds thermal energy to the ionization chamber to increase efficiency of ionization. The ends of elements 74 project from the ion chamber for connection to a voltage source. FIGS. 11 and 12 illustrate an alternative arrangement wherein a single heater element 75 is incorporated within repeller electrode 29, with the ends of filament 75 extending from the ion chamber for connection to a source.

The leak detector apparatus illustrated herein is not confined to any one particular method of leak testing for minute leaks. As an illustrative example, FIG. 1 illustrates schematically the helium envelope method for determining the presence of leaks in a vacuum tube 76. The tracer gas 77 is arranged to surround completely tube 76, which tube is placed in an envelope 78 of suitable material containing helium. Tube 76 is coupled to leak detector 20 by means of inlet 39. It will be understood that vacuum tube 76 has been evacuated, for example by means of auxiliary vacuum pump means 79. After the desired pressure in vacuum tube 76 is reached, as indicated by a gage 80, a valve 81 to auxiliary pump 79 is closed and an inlet valve 82 on leak detector 20 is opened. Leak detector 20 has been brought to and maintained at its operating pressure by its self-contained vacuum system (not shown) coupled to outlet 40 so that a gas mixture drifts from tube 76, inlet 39 through leak detector 20 and returns through outlet 40 by reason of the pressure differential created by connected devices. This pressure differential will cause the helium to pass rapidly through any leak if present in tube 76 and into line 39 for detection. The signal from helium entering detector 20 and resolved thereby will indicate a total leak rate.

Reference is now made to FIG. 15 which illustrates a mass spectrometer 90 employing an electrostatic analyzer as the first analyzer followed by a magnetic analyzer. The ion source is depicted at the left and includes an electron beam 91. The apparatus also includes an ion exit and focus electrode 92, accelerator electrode means 93, spaced electrode plates 94a, b, an interstage slit electrode 95, baffle means 96, a magnetic analyzer 97, baffle means 98, and ion detector means depicted by a slit electrode 99 and collector 100. The ionized beam 101 is initially accelerated by a potential drop between electrodes 92, 93; for example, plus 300 volts is applied to electrode 92 with respect to ground. The opposed inner curved surfaces defining electrodes 94a, b are accurately spaced apart in parallel relationship with respect to the axis of symmetry of beam 101 travelling therebetween. In the illustrated embodiment, plates 94a, b are operated at plus 50 and minus 50 volts with respect to ground, respectively, and magnetic analyzer 97 is adapted to provide a 1000 gauss field. The apparatus illustrated in FIG. 15 provides simultaneous correction for both velocity and direction inhomogeneities of ion beam 101, because double focus apparatus as contemplated herein refocuses beams which are inhomogeneous both in velocity and direction. Ions of one mass but heterogeneous in energy are focused by apparatus 90, whereby the illustrated arrangement is applicable as a leak detector and has proved effective in reducing background due to gas scattering at operating pressures in the order of $10^{-5}$ mm. Hg to provide a high sensitivity response. As illustrated herein, beam 101 is not accelerated after emergance from analyzer 94a, b. However, acceleration may be added by applying a suitable potential difference between electrodes 95, 96. In like manner, acceleration may be imparted to beam 101a after analyzer 97 and before detection. Acceleration between analyzers, as noted hereinbefore, adds different amounts of momentum to ions of different mass thereby greatly increasing sensitivity for adjacent peaks; whereas, acceleration after the last analyzer adds energy to beam 101a thereby increasing the secondary-emission ratio of collector 100 and thus increases the signal to noise ratio of the output signal.

It is intended that all matter contained in the above description or shown in the accompanying drawings shall be interpreted as illustrative and not in a limiting sense.

What is claimed is:

1. A mass spectrometer leak detector that uses a tracer gas having a predetermined mass to charge ratio comprising, ion producing and accelerating means adapted for supplying a beam of ions of heterogeneous mass to charge ratio along a predetermined direction of travel, ion detecting means, a plurality of magnetic analyzer means spaced along the path of ion travel intermediate said ion producing means and said ion detecting means, said analyzer means being adapted to selectively separate said ion beam into beams of ions of homogeneous mass to charge ratio, an interstage electrode between a spaced pair of said magnetic analyzers and having an aperture for selectively passing a substantially resolved beam of ions of said predetermined mass to charge ratio therethrough and towards the second analyzer of said pair, conducting means between one analyzer of said pair and said interstage electrode and having an opening for passing the resolved ion beam therethrough, and means for insulating said conducting means from said interstage electrode for operation at different potentials for selectively accelerating grouped ions of different mass to charge ratio for selective resolution by the second analyzer of said pair.

2. In combination, apparatus comprising ion producing and accelerating means adapted for supplying a beam of ions of heterogeneous mass to charge ratio along a predetermined direction of travel, ion detecting means, a plurality of magnetic analyzer means spaced along the path of ion travel intermediate said ion producing means and said ion detecting means, said analyzer means being adapted to selectively separate said ion beam into beams of ions of homogeneous mass to charge ratio, an interstage electrode between a spaced pair of said magnetic analyzers and having an aperture for selectively passing a substantially resolved beam of ions of predetermined mass to charge ratio therethrough and towards the second analyzer of said pair, conducting means between one analyzer of said pair and said interstage electrode and having an opening for passing the resolved ion beam therethrough, and means for insulating said conducting means from said interstage electrode for operation at different potentials for selectively accelerating grouped ions of different mass to charge ratio for selective resolution by the second analyzer of said pair, said ion producing and accelerating means including filament means for emitting electrons, electron collector means spaced from said filament means, electron focusing means between said filament means and said collector means for providing an electron beam, said electron focusing means having an electron aperture whose cross-section is shaped like a section through a symmetrical double convex lens for providing an electrostatic field for focusing said electrons to form a beam characterized by a substantially uniform rectilinear cross-section, and electrode means between said focusing means and said collector means and having a rectilinear slit oriented to conform with the cross-section of said electron beam for intercepting straying electrons.

3. Apparatus as defined in claim 2 further including, an electrode on one side of the beam of electrons for repelling gas particles ionized thereby, electrode means along the other sides of said beam of electrons, the gas ions being accelerated towards the individual one of said last-mentioned electrode means on the opposite side of said beam of electrons and confronting said repeller electrode, said individual electrode means having a slit for allowing ion flow therethrough and towards the first of said analyzers.

4. Apparatus as defined in claim 3 wherein said individual electrode means having portions extending integrally therefrom towards said repeller electrode, said portions projecting along opposite sides of said electron beam, and heater means contained in said portions for heating the repeller electrode, the individual electrode and the electrode means between said focusing means and collector, wherein the ion producing means is provided with increased thermal energy, and whereby efficiency of ion formation is increased.

5. Apparatus as defined in claim 3 wherein said repeller electrode comprising, a hollow conductor having a heating element therein for heating said repeller electrode, said opposite individual electrode and said intercepting electrode means.

6. A mass spectrometer leak detector that uses a tracer gas having a predetermined mass to charge ratio comprising, ion producing and accelerating means adapted for supplying a beam of ions of heterogenous mass to charge ratio along a predetermined direction of travel, ion detecting means, a plurality of analyzer means spaced along the path of ion travel intermediate said ion producing means and said ion detecting means, said analyzer means being adapted to selectively separate said ion beam into beams of ions of homogenous mass to charge ratio, interstage electrode between a spaced pair of said analyzers and having an aperture for selectively passing a substantially resolved beam of ions of said predetermined mass to charge ratio therethrough and towards the second analyzer of said pair, conducting means between one analyzer of said pair and said interstage electrode and having an opening for passing the resolved ion beam therethrough, and means for insulating said conducting means from said interstage electrode for operation at different potentials to accelerate said ion beam.

7. Apparatus as defined in claim 6 wherein the first of said analyzers comprising, a pair of spaced electrodes operated at suitable potentials to define an electrostatic analyzer between which the ionized beam travels.

8. A mass spectrometer leak detector that uses a tracer gas having a predetermined mass to charge ratio comprising, ion producing and accelerating means adapted for supplying a beam of ions of heterogeneous mass to charge ratio along a predetermined direction of travel, ion detecting means, first and second magnetic analyzer means spaced along the path of ion travel intermediate said ion producing means and said ion detecting means, said analyzer means being individually adapted to selectively separate said ion beam into beams of ions of homogenous mass to charge ratio including said predetermined mass to charge ratio, and accelerating means following each of said magnetic analyzer means for selectively accelerating ions of different mass to charge ratio moving thereby.

9. Apparatus as defined in claim 8 wherein the accelerating means following said first analyzer comprising, conductive means having an opening for passing the beam of ions resolved by said first analyzer, an accelerating electrode spaced from and following said conductive means and having an interstage slit for passing said ion beam, and second conductive means spaced from and following said accelerating electrode and having an opening for passing said ion beam towards said second analyzer.

10. Apparatus as defined in claim 8 wherein the accelerating means after said second analyzer comprising, conductive means having an opening allowing a convergence of beam of ions resolved by said second analyzer, and an accelerating electrode following said conductive means and having a slit for passing said ion beam.

11. A mass spectrometer leak detector that uses a tracer gas having a predetermined mass to charge ratio comprising, ion producing and accelerating means adapted for supplying a beam of ions of heterogeneous mass to charge ratio along a predetermined direction of travel, ion detecting means, electrostatic analyzer means followed by magnetic analyzer means spaced along the path of ion travel intermediate said ion producing means and said ion detecting means, said last analyzer means being individually adapted to selectively separate said ion beam into beams of ions of homogeneous mass to charge ratio including said predetermined mass to charge ratio, and accelerating means following said electrostatic analyzer means for selectively accelerating grouped ions of different mass to charge ratio moving thereby.

12. In a mass spectrometer for detecting leaks in a vacuum sealed structure, a process for slectively resolving a gaseous mixture taken from said structure wherein said mixture is constituted by a plurality of two or more gases of respective mass, comprising the steps of, introducing the gaseous mixture into an ionization chamber for ionizing said mixture by collision with a beam of electrons contained in said chamber, focusing and accelerating the ionized mixture emerging from said chamber through a predetermined potential drop for causing said mixture to travel as an ion beam along a predetermined direction, focusing and selectively separating the ionized beam by a pair of spaced first order focusing magnetic analyzers providing a homogeneous magnetic field through which the ionized beam passes, accelerating the ionized beam emerging from each analyzer through a predetermined potential drop, and causing the ionized beam falling through the last potential drop to impinge as an incident beam upon ion detecting means characterized by a secondary-emission ratio increasing in proportion to the potential of the incident beam, whereby leak detection is characterized by high sensitivity at favorable signal to noise ratio.

13. A method for detecting minute leaks using a predetermined tracer gas through the hermetically sealed walls of vacuum or pressure sealed apparatus comprising the steps of: ionizing said gas from a minute leak through said walls; focusing and accelerating ions produced by ionizing said gas to provide a substantially monoenergetic ion beam; analyzing and resolving the ions of said beam to provide a first focus of ions; further accelerating said ions; reanalyzing and resolving the accelerated ions to provide a second focus of ions having a predetermined mass to charge ratio related to said gas; and detecting the ions of said predetermined mass to charge ratio at said second focus to provide an indication of the gas leaking through said walls.

14. A method for detecting minute leaks using a predetermined tracer gas through the hermetically sealed walls of vacuum or pressure sealed apparatus comprising the steps of: ionizing said gas from a minute leak through said walls; focusing and accelerating ions produced by ionizing said gas to provide a substantially monoenergetic ion beam; magnetically analyzing and resolving the ions of said beam to provide a first focus of ions having a predetermined mass to charge ratio related to said gas; further accelerating said ions; magnetically analyzing and resolving the accelerated ions to provide a second focus of ions having said predetermined mass to charge ratio; and detecting the ions of said predetermined mass to charge ratio at said second focus to provide an indication of the gas leaking through said walls.

15. A method for detecting minute leaks using a predetermined tracer gas through the hermetically sealed walls of a vacuum or pressure sealed apparatus comprising the steps of: ionizing said gas from a minute leak through said walls; focusing and accelerating ions produced by ionizing said gas to provide a substantially monoenergetic ion beam; electrostatically selecting ions having a narrow energy spread, orders of magnitude less than the energy spread in said monoenergetic ion beam, to provide a first focus of all ions; magnetically analyzing and resolving the ions from said first focus to provide a second focus of ions having a predetermined mass to charge ratio related to said gas; and detecting the ions of said predetermined mass to charge ratio at said second focus to provide an indication of the gas leaking through said walls.

16. A method for detecting minute leaks using a predetermined tracer gas through the hermetically sealed walls of a vacuum or pressure sealed apparatus comprising the steps of: ionizing said gas from a minute leak through said walls; focusing and accelerating ions produced by ionizing said gas to provide a substantially monoenergetic ion beam at a first potential of the order of 300 volts; magnetically analyzing and resolving said beam to provide a first focus of ions having a predetermined mass to charge ratio related to said gas; passing the ions having said predetermined mass to charge ratio through an ion acceleration field to increase the potential of said ion beam to a value which is approximately twice said first potential; magnetically analyzing and resolving the ions of said beam of increased potential to provide a second focus of ions having said predetermined mass to charge ratio; and detecting the ions of said predetermined mass to charge ratio at said second focus to provide an indication of said gas.

References Cited by the Examiner

UNITED STATES PATENTS

| | | | |
|---|---|---|---|
| 2,427,484 | 9/1947 | West | 250—41.9 |
| 2,642,535 | 6/1953 | Schroeder | 250—41.9 |
| 2,659,821 | 11/1953 | Hipple | 250—41.9 |
| 2,754,422 | 7/1956 | Lofgren et al. | 250—41.9 |
| 2,821,632 | 1/1958 | Wright | 250—41.9 |
| 2,824,987 | 2/1958 | Weissenberg et al. | 250—41.9 |
| 2,837,653 | 6/1958 | Craig et al. | 250—41.9 |
| 2,854,583 | 9/1958 | Robinson | 250—41.9 |
| 2,950,388 | 8/1960 | White | 250—41.9 |
| 2,957,985 | 10/1960 | Brubaker | 250—41.9 |
| 2,967,239 | 1/1961 | Zemany | 250—41.9 |

RALPH G. NILSON, *Primary Examiner.*

WALTER STOLWEIN, ARTHUR GAUSS, *Examiners.*